United States Patent Office 2,859,235
Patented Nov. 4, 1958

2,859,235
PROCESS FOR THE PRODUCTION OF ISOTHIOCYANATES

Erich Schmidt, Munich, Robert Schnegg, Dormagen, Germany, Franz Zaller, deceased, late of Munich, Germany, by Erni Zaller, administratrix, Munich, and Fritz Moosmüller, Dormagen, Germany, assignors to Farbenfabriken Bayer Aktiengesellschaft, Leverkusen, Germany, a corporation of Germany No Drawing. Application January 5, 1955
Serial No. 480,064

Claims priority, application Germany January 26, 1954

8 Claims. (Cl. 260—454)

Isothiocyanates have the general formula RNCS, wherein R can be an aliphatic, hydroaromatic, aromatic or aromatic-aliphatic radical. The radical designated by R may be substituted by other atoms or atom groups.

According to the hitherto known methods aliphatic isothiocyanates may be produced by rearrangement of thiocyanates of the formula RSC=N, or from N-monosubstituted alkyl dithio-carbaminates of the formula

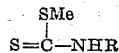

by treatment with salts of heavy metals. Another synthesis of isothiocyanates employs the reaction of thiophosgene with amines.

Aromatic isothiocyanates may also be produced from thiocarbanilides by reaction with, for instance, concentrated hydrochloric acid. Another method starts from the isonitriles, from which isothiocyanates can be obtained by addition of sulfur.

All these known processes have considerable disadvantages which consist either in the difficulty of preparing the starting materials or in the poor yields of the reaction so the isothiocyanates have hitherto not been employed in chemical technology, although they may be of considerable importance for pharmacological purposes owing to their physiological properties and for the production of plastics, dyestuffs or intermediates owing to the high reactivity of their cumulated double bonds.

It is therefore an object of the present invention to provide a simple process for the production of organic isothiocyanates;

A further object is to provide a process which starts from readily accessible starting materials;

Another object is the provision of a process which has high yields of the desired organic isothiocyanates, thus rendering the isothiocyanates available for commercial purposes;

Further objects will become apparent as the following specification proceeds.

The process consists in contacting a salt of an N-monosubstituted dithiocarbamic acid with an alkaline hypohalite solution. The reaction proceeds according to the following formula:

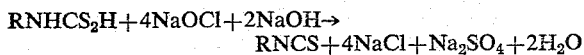

The reaction is preferably carried out by slowly introducing while stirring an alkaline aqueous hypohalite solution into the solution or emulsion of the dithiocarbaminate in water in the presence of an organic solvent which is preferably heavier than water such as a chlorinated hydrocarbon like methylene chloride or carbon tetrachloride, care being taken that the temperature of the reaction mixture does not exceed 7° C. The organic isothiocyanate formed then passes into the methylene chloride phase from which it can be recovered after separating the water and evaporating the methylene chloride.

It is remarkable that the yields of the process are unchanged in large batches. New isothiocyanates can be produced according to the present process which contain in the organic moiety substituents having acid or basic function. Substituents having a basic function are e. g. dialkyl aminoalkyl radicals, as substituents with an acid function e. g. sulfonamide-, sulfonic acid- or carboxylic acid groups such as they are present in p-amino benzoic acid or in sulfanilamide.

The isothiocyanates are obtained in the methylene chloride solution in so pure a state that in many cases it is unnecessary to purify them further. The crude solutions can often be employed directly for further syntheses e. g. for reaction with compounds having reactive hydrogen atoms like amines, alcohols etc.

Since the reaction of the dithiocarbaminates with sodium hypochlorite proceeds very quickly and with high yields the process can be easily carried out continuously. This is of special importance for the commercial production of isothiocyanates.

Example 1

1 mol of n-butylamine is dropped into a suspension of 1.21 moles of carbon disulfide and 2.21 moles (=166 ml.) of a 25% aqueous solution of ammonia in the course of 1 hour in a vessel provided with a dropping funnel, stirrer and reflux condenser, which is cooled with a mixture of ice and common salt. When the addition of n-butylamine is completed the reaction mixture, which is now a slurry, is stirred for another 4 hours and then stored for 12 hours at room temperature.

The reaction mixture is then poured into a wide-necked flask of 6 liters content into 1 liter of water and cooled with a mixture of ice and common salt. The aqueous solution contains the ammonium salt of the N-butyl dithiocarbamic acid.

To the cooled aqueous solution 600 ml. of methylene chloride are then added while stirring and the mixture is cooled with a mixture of ice and common salt to 0° C. The mixture is stirred and 2 liters of ice-cooled aqueous sodium hypochlorite solution, containing 149 grams of aqueous hypochlorite per liter (4 moles) and 4 moles of sodium hydroxide is dropped in so slowly, that the temperature of the reaction mixture does not exceed 7° C. Separation of sulfur is observed.

When the addition of hypochlorite is completed the mixture is stirred for another ½ hour. Then the methylene chloride layer is separated from the aqueous layer in the separating funnel. The aqueous layer is shaken three times with 100 ml. of methylene chloride. The united methylene chloride solutions are washed with 200 ml. of water and after separating the water, shaken three times with 500 ml. of methylene chloride each. The united methylene chloride solution is dried over freshly calcined, powdered magnesium sulfate. For recovering the butyl isothiocyanate the methylene chloride is distilled off over a short Widmer-spiral and the remaining dark coloured isothiocyanate is completely distilled in vacuo from a dark residue into an ice-cooled receiver with rising temperature of the oil bath. After a second rectification the yellow butyl isothiocyanate boils uniformly at 58–59.5° C. at 9 mm. pressure. It is colourless. The yield amounts to 91.3 grams=79.2% of the theoretical.

Example 2

For the production of cyclohexyl dithiocarbaminate 1 mol of cyclohexyl amine is dissolved in 166 ml. (2.21 moles) of a 25% aqueous solution of ammonia and within 1 hour dropped into 95.2 grams (=1.25 moles) of carbon disulfide cooled with brine. The reaction mixture containing the ammonium salt of cyclohexyl dithiocarbamic acid is poured into a wide-necked flask as described in Example 1 and after the addition of 600 ml. of methylene chloride while cooling an aqueous solution of 4 moles of sodium hypochlorite and 4 moles of sodium hydroxide is slowly dropped in. The methylene chloride phase is separated and distilled off according to Example 1. 116.3 grams (82.4% of the theoretical) of the colourless cyclohexylisothiocyanate of the boiling point 94–95° C. at 9 mm. pressure are obtained.

*Example 3*

From 93.12 grams (1 mol) ammonium phenyl dithiocarbaminate produced in the same manner as the ammonium butyl dithiocarbaminate according to Example 1 119 grams (88.1% of the theoretical) of phenyl isothiocyanate are obtained according to the prescription given in the previous examples. Phenyl isothiocyanate distills at 89–90° C. at 9 mm. pressure as a colourless oil.

*Example 4*

The solution of 1 mol 1-amino-3-dimethylaminopropane in 500 ml. of methylene chloride is dropped to the mechanically stirred, ice-cooled solution of 95.2 grams (=1.25 moles) of carbon disulfide in 100 ml. of methylene chloride. The ammonium salt of the 1-amino-3-dimethylaminopropane dithiocarbamic acid separates. The reaction mixture is stirred for another 1½ hours and, as in the previous examples, slowly mixed with the aqueous solution of 4 moles of sodium hypochlorite and sodium hydroxide at about 0° C.

For recovery, the methylene chloride phase is distilled under normal pressure until the temperature of the oil bath has reached 80° C. The balance of the methylene chloride is distilled under reduced pressure. The isothiocyanate is dissolved from the dark residue in the distillation flask at normal temperature by extracting three times with 150 ml. of dried petroleum ether each time. These solutions are decanted from the undissolved matter because the undissolved substances hinder the distillation of the isothiocyanate and reduce its yield. The solution dried over calcined magnesium sulfate is distilled at 91–92° C. at 1 mm. pressure after evaporation of the petroleum ether. 103 grams (71.4% of the theoretical) of isothiocyanate are obtained as a colourless, basic reacting compound which is slightly soluble in water and is not separated from its solutions in dilute, aqueous acids by addition of dilute aqueous alkali metal hydroxides.

The isothiocyanate forms a picrate with picric acid in hot alcohol which crystallizes in yellow leaflets of the melting point 108–109° C.

*Example 5*

The solution of 158.2 grams (1 mol) of 1-diethylamino-4-aminopentane in 300 ml. of dried petroleum ether is dropped into a mechanically stirred, ice-cooled solution of 95.2 grams (1.25 moles) of carbon disulfide in 100 ml. of petroleum ether inside two hours. The ammonium salt of the diethylaminopentane-dithiocarbamic acid-(4) separates almost immediately. The reaction mixture is stirred for another 1½ hours and the petroleum ether is decanted from the finely distributed yellowish dithiocarbaminate. The latter is poured into a 6 liters flask, as described in the previous examples, and cooled. Thereupon 600 ml. of methylene chloride, 4 moles of sodium hypochlorite and 4 moles of sodium hydroxide in aqueous solution are added while stirring. 158.7 grams (79.3% of the theoretical) of the yellow 1-diethylaminopentane-isothiocyanate-(4) are obtained which is stored over sodium hydroxide for 48 hours, distilled at 124–126° C. at 9 mm. pressure and yields a nearly colourless, basic reacting oil which is slightly soluble in water. The compound is not separated from its dilute acid solutions upon addition of alkali metal hydroxides.

*Example 6*

For carrying out the process continuously an apparatus is especially suitable which is described in U. S. Patent 2,656,883.

For the production of, for instance, isopropyl isothiocyanate a solution of isopropyl dithiocarbaminate in methylene chloride is contacted in counter-current with a cooled sodium hypochlorite solution. The methylene chloride which collects at the lower end of the countercurrent apparatus contains the isopropyl isothiocyanate formed.

This solution is continuously freed of methylene chloride and the residual isopropyl isothiocyanate is subjected to purification by fractionation. The pure isopropyl isothiocyanate which is obtained in a yield of about 80 percent boils at 29–30° C. at 10 mm. pressure.

We claim:

1. A process for producing an organic isothiocyanate which comprises reacting an ammonium dithiocarbamate of the formula

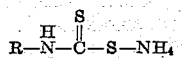

wherein R is a radical selected from the group consisting of lower alkyl, dialkylaminoalkyl, cyclohexyl, and phenyl, in an organic solvent with an aqueous alkaline solution of an alkali metal hypohalite.

2. A process of producing an organic isothiocyanate which comprises slowly introducing an aqueous alkaline solution of an alkali metal hypohalite into a methylene chloride solution of an N-monosubstituted ammonium dithiocarbamate of the formula

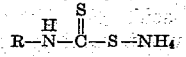

wherein R is a radical selected from the group consisting of lower alkyl, dialkylaminoalkyl, cyclohexyl, and phenyl, at a temperature between −10° C. and +7° C., separating the methylene chloride phase, evaporating the methylene chloride and recovering the organic isothiocyanate formed.

3. Process of claim 2 wherein the dithiocarbamate is the ammonium salt of N-butyl-dithiocarbamic acid.

4. Process of claim 2 wherein the dithiocarbamate is the ammonium salt of N-cyclohexyl-dithiocarbamic acid.

5. Process of claim 2 wherein the dithiocarbamate is the ammonium salt of N-phenyldithiocarbamic acid.

6. Process of claim 2 wherein the dithiocarbamate is the ammonium salt of N-(1-amino-3-dimethylaminopropane)-dithiocarbamic acid.

7. Process of claim 2 wherein the dithiocarbamate is the ammonium salt of N-(diethylamino-pentane)-dithiocarbamic acid.

8. Process of claim 2 wherein the methylene chloride solution of the dithiocarbamate is contacted with the alkali metal hypochlorite solution continuously and countercurrently, the methylene chloride phase separated continuously, and the methylene chloride distilled off continuously.

References Cited in the file of this patent

UNITED STATES PATENTS 2,595,723     Spiegelberg et al. _____ May 6, 1952

FOREIGN PATENTS 105,245     Australia _____ Sept. 20, 1938

OTHER REFERENCES

Degering: "An Outline of Org. Nitrogen Compounds" (1945), p. 547.